(12) United States Patent
Kern et al.

(10) Patent No.: US 12,615,232 B2
(45) Date of Patent: Apr. 28, 2026

(54) NETWORK TRAFFIC MANAGEMENT

(71) Applicant: Telefonaktiebolaget LM Ericsson (publ), Stockholm (SE)

(72) Inventors: András Kern, Budapest (HU); Balázs Peter Gerö, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 108 days.

(21) Appl. No.: 18/037,822

(22) PCT Filed: Nov. 20, 2020

(86) PCT No.: PCT/EP2020/082914
§ 371 (c)(1),
(2) Date: May 19, 2023

(87) PCT Pub. No.: WO2022/106029
PCT Pub. Date: May 27, 2022

(65) Prior Publication Data
US 2023/0421533 A1     Dec. 28, 2023

(51) Int. Cl.
*H04L 61/5076* (2022.01)
*H04L 61/4511* (2022.01)
(52) U.S. Cl.
CPC ...... *H04L 61/5076* (2022.05); *H04L 61/4511* (2022.05)
(58) Field of Classification Search
CPC .......................... H04L 61/5076; H04L 61/4511
See application file for complete search history.

(56) References Cited

U.S. PATENT DOCUMENTS

| | | | | |
|---|---|---|---|---|
| 10,972,426 B1* | 4/2021 | Sinha | ................... | H04L 61/4511 |
| 2005/0286510 A1* | 12/2005 | Nakajima | ........... | H04L 12/2859 370/386 |
| 2010/0131646 A1* | 5/2010 | Drako | ................. | H04L 63/0263 709/225 |
| 2018/0063075 A1* | 3/2018 | Eckert | ................. | H04L 61/5014 |

OTHER PUBLICATIONS

3rd Generation Partnership Project, "3rd Generation Partnership Project; Technical Specification Group Services and System Aspects; Study on enhancement of support for Edge Computing in 5G Core network (5GC) (Release 17)", Technical Report, 3GPP TR 23.748 V1.1.0, Oct. 2020, pp. 1-243, 3GPP.

(Continued)

*Primary Examiner* — Andrew C Georgandellis
(74) *Attorney, Agent, or Firm* — Weisberg I.P. Law, P.A.

(57) ABSTRACT

There is provided a method performed by an entity for managing traffic between a network gateway and an application server. In response to a user equipment (UE) connecting to or disconnecting from the network gateway, a network prefix assigned to a DNS view is updated (102). The network prefix comprises one or more internet protocol (IP) addresses that each identify a UE that is connected to the network gateway and to which the DNS view is accessible. Traffic between the network gateway and the application server is steered according to the DNS view to which the updated network prefix is assigned.

16 Claims, 3 Drawing Sheets

(56)  References Cited

OTHER PUBLICATIONS

3rd Generation Partnership Project, "3rd Generation Partnership Project; Technical Specification Group Services and System Aspects; Study on application architecture for enabling Edge Applications; (Release 17)", Technical Report, 3GPP TR 23.758 V17.0.0, Dec. 2019, pp. 1-113, 3GPP.

ETSI, "Multi-access Edge Computing (MEC); MEC Management; Part 2: Application lifecycle, rules and requirements management", Group Specification, ETSI GS MEC 010-2 V2.1.1, Nov. 2019, pp. 1-134, ETSI.

Waldner, "Geolocation-aware DNS with Bind", Feb. 1, 2010, pp. 1-9, retrieved on May 12, 2023, retrieved from internet: https://backreference.org/2010/02/01/geolocation-aware-dns-with-bind/.

Microsoft Learn, "Use DNS Policy for Geo-Location Based Traffic Management with Primary Servers", Sep. 20, 2021, pp. 1-6, retrieved on May 12, 2023, retrieved from internet: https://docs.microsoft.com/en-us/windows-server/networking/dns/deploy/primary-geo-location.

ETSI, "Multi-access Edge Computing (MEC); MEC Management; Part 2: Application lifecycle, rules and requirements management", Group Specification, ETSI GS MEC 010-2 V2.1.6, Sep. 2020, pp. 1-148, ETSI.

* cited by examiner

10

14

Memory

12

Processing
Circuitry

16

Communications
Interface

Update a network prefix of an IP address of the UE,
wherein the network prefix is assigned to a DNS
view that is accessible by the UE

102

NETWORK TRAFFIC MANAGEMENT

TECHNICAL FIELD

The disclosure relates to a method for managing traffic between a network gateway and an application server, and an entity configured to operate in accordance with that method.

BACKGROUND

In an edge cloud scenario, a network infrastructure of a mobile operator comprises a plurality of sites. Each site of the network infrastructure comprises a mobile network gateway. For example, each site of a fifth generation (5G) mobile network infrastructure comprises a user plane function (UPF) that acts as a network gateway and each site of a fourth generation (4G) mobile network infrastructure comprises a packet data network gateway (PDN-GW). Each site of the network infrastructure also comprises additional compute resources, such as servers. The gateway and the compute resources are connected over a site internal network. The compute resources may run applications that serve requests generated by mobile users. Such requests reach the compute resources through the mobile network gateway.

A domain name service (DNS) implements a mapping of domain names to routable internet protocol (IP) addresses. DNS servers often offer a functionality referred to as "DNS views", when a response to a query depends on some attributes of the query itself, such as the IP address of the query originator. DNS views are applied to implement global traffic steering. For example, requests of European users may be resolved to the IP address of a server residing in a European data centre, while other requests may be translated to the IP address of a server residing in the US. This DNS functionality is referred to in the art as a geolocation function.

The multi-access edge computing (MEC) initiative of the European Telecommunications Standards Institute (ETSI) group defines an architecture that utilises DNS traffic steering. The MEC platform configures DNS for traffic steering in an edge cloud context. Section 6.2.1.13.2 of ETSI GS MEC 010-2 V2.1.1 defines the content of DNS rules by associating the DNS name or, more specifically, a fully qualified domain name (FQDN) for the DNS to an IP version 4 (IPv4) or IP version (IPv6) address.

Virtual infrastructure management (VIM) systems are responsible for deploying, scaling, and removing applications that are provided as virtual machines on the compute resources of the sites of a network infrastructure. Container infrastructure management (CIM) systems have a similar purpose but CIM systems handle applications that are provided as containers. Examples of orchestration tools used to orchestrate these VIM and CIM systems are OpenStack and Kubernetes. Both VIM and CIM systems configure the DNS system of an operator by registering an externally visible (service) IP address allocated for an application at a certain VIM/CIM instance. For Kubernetes, the external DNS is an example component that performs such registration.

The DNS rule based configuration of a MEC platform alone is not able to implement user group based traffic steering. Therefore, a dedicated forwarding component (e.g. a UPF or PDN-GW) needs to be defined to implement granular traffic steering. However, this does not work for loosely coupled edge cloud scenarios as the cloud provider does not have access to such a forwarding component. As such, the existing DNS traffic steering techniques offered by hyperscale cloud providers are based on a static, user provided, configuration. The existing techniques are thus unable to follow the changing IP assignments of users and groups of user.

SUMMARY

It is thus an object of the disclosure to obviate or eliminate at least some of the above-described disadvantages associated with existing techniques.

Therefore, according to an aspect of the disclosure, there is provided a method performed by an entity for managing traffic between a network gateway and an application server. The method comprises, in response to a user equipment (UE) connecting to or disconnecting from the network gateway, updating a network prefix assigned to a domain name service (DNS) view. The network prefix comprises one or more internet protocol (IP) addresses that each identify a UE that is connected to the network gateway and to which the DNS view is accessible. Traffic between the network gateway and the application server is steered according to the DNS view to which the updated network prefix is assigned.

In this way, an advantageous technique for managing traffic between a network gateway and an application server is provided. The technique is improved over existing techniques since it enables the (e.g. continuous) adaptation of a DNS based traffic steering to changes in the distribution of UEs for more reliable and effective traffic steering. Moreover, the technique enables DNS based traffic steering at UE (or UE group) level without requiring tight integration to any core user plane nodes, such as the user plane function (UPF) node in a 5G core network. The technique can also enable session continuity at application level when a UE changes anchor node (e.g. UPF node in a 5G core network) during mobility.

In some embodiments, updating the network prefix assigned to the DNS view may comprise deleting a first network prefix that is currently assigned to the DNS view and/or assigning a second network prefix to the DNS view, wherein the second network prefix is a different prefix to the first network prefix.

In some embodiments, deleting the first network prefix that is currently assigned to the DNS view may be performed in response to the UE disconnecting from the network gateway and/or assigning the second network prefix to the DNS view may be performed in response to the UE connecting to the network gateway.

In some embodiments, the method may comprise deleting the first network prefix that is currently assigned to the DNS view at one or more DNS servers that comprise the DNS view and/or assigning the second network prefix to the DNS view at the one or more DNS servers that comprise the DNS view.

In some embodiments, the method may comprise identifying the one or more DNS servers that comprise the DNS view to which the first network prefix is assigned.

In some embodiments, the method may comprise calculating the second network prefix.

In some embodiments, the method may be performed in response to receiving a notification that the UE has connected to or disconnected from the network gateway.

In some embodiments, the entity may be subscribed to receive the notification.

In some embodiments, the notification may comprise the second network prefix.

In some embodiments, the notification may comprise an identifier that identifies the UE that is connecting to or disconnecting from a network gateway and/or an identifier that identifies the network gateway.

In some embodiments, the identifier that identifies the UE may comprise the IP address of the UE and/or a generic public subscriber identifier (GPSI) of the UE, and/or the identifier that identifies the network gateway may comprise a data network access identifier (DNAI).

In some embodiments, the method may comprise monitoring the UE and/or the network gateway to identify the UE connecting to or disconnecting from the network gateway.

In some embodiments, the network prefix may be updated based on one or more policies associated with the UE that is connecting to or disconnecting from a network gateway and/or one or more characteristics of the UE that is connecting to or disconnecting from a network gateway.

In some embodiments, the one or more policies may be associated with the UE only or a group of UEs that comprises the UE.

In some embodiments, the one or more policies may be stored in at least one memory and the method may comprise acquiring the one or more policies from the at least one memory.

In some embodiments, acquiring the one or more policies from the at least one memory may comprise reading the one or more policies from the at least one memory or receiving the one or more policies from the at least one memory in response to a request for the one or more policies.

In some embodiments, the one or more policies may be stored in the at least one memory subsequent to a deletion of at least one policy from the memory and/or an addition of at least one policy to the memory.

In some embodiments, the method may comprise identifying the one or more policies that are associated with the UE that is connecting to or disconnecting from a network gateway by identifying the one or more policies that comprise an identifier that identifies the UE that is connecting to or disconnecting from a network gateway.

According to another aspect of the disclosure, there is provided an entity configured to operate in accordance with the method described earlier. The entity thus provides the advantages described earlier.

In some embodiments, the entity may comprise processing circuitry configured to operate in accordance with the method described earlier.

In some embodiments, the entity may comprise at least one memory for storing instructions which, when executed by the processing circuitry, cause the entity to operate in accordance with the method described earlier.

According to another aspect of the disclosure, there is provided a computer program comprising instructions which, when executed by processing circuitry, cause the processing circuitry to perform the method described earlier. The computer program thus provides the advantages described earlier.

According to another aspect of the disclosure, there is provided a computer program product, embodied on a non-transitory machine-readable medium, comprising instructions which are executable by processing circuitry to cause the processing circuitry to perform the method described earlier. The computer program product thus provides the advantages described earlier.

Therefore, an advantageous technique for managing traffic between a network gateway and an application server is provided.

4

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned earlier, an advantageous technique for managing traffic between a network gateway and an application server is described herein. The technique described herein is performed in response to a user equipment (UE) of a network connecting to or disconnecting from the network gateway.

The network referred to herein can be a telecommunications network, such as a mobile network. The network referred to herein can be a fourth generation (4G) mobile network, a fifth generation (5G) mobile network, or any other generation mobile network. In some embodiments, the network referred to herein can be a core network, such a mobile core network. The network referred to herein may, for example, be a radio access network (RAN), or any other type of telecommunications network.

The network referred to herein can comprise one or more network gateways. Alternatively, one or more network gateways may be external to the network referred to herein. The one or more network gateways can be for use in connecting one or more user equipments (UEs) to one or more application servers. The one or more UEs can thus be connected to one or more network gateways. The one or more network gateways can be configured to steer (or route) traffic between the one or more UEs in the network and the one or more application servers. An application server can be a server that is operable (e.g. configured) to run one or more applications.

In some embodiments, the network referred to herein can be a virtualized network (e.g. comprising virtual network nodes), an at least partially virtualized network (e.g. comprising at least some virtual network nodes and at least some hardware network nodes), or a hardware network (e.g. comprising hardware network nodes).

Figure 1:
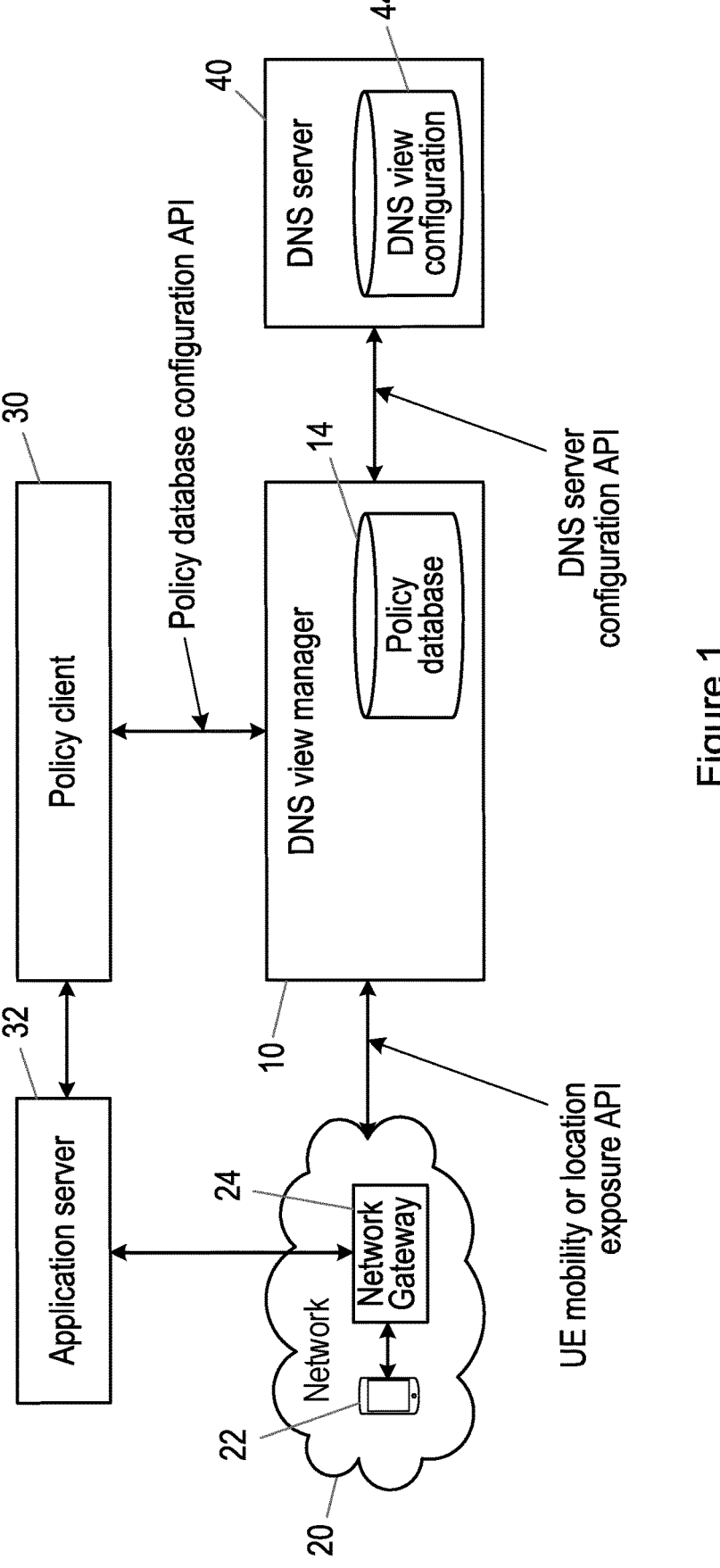
FIG. 1 is a block diagram illustrating a system according to an embodiment.

FIG. 1 illustrates a system in accordance with an embodiment. As illustrated in FIG. 1, the system comprises an entity 10. As also illustrated in FIG. 1, the system can comprise one or both of a network gateway 24 and an application server 32 according to some embodiments. The entity 10 is for managing traffic between the network gateway 24 and the application server 32. The technique described herein is thus implemented by this entity 10. Herein, the entity 10 may also be referred to as a DNS view manager. For example, in some embodiments, the entity 10 can be an entity that is responsible for managing DNS views. As illustrated in FIG. 1, in some embodiments, the entity 10 can comprise a memory (e.g. a database) 14. The memory 14 of the entity 10 can be configured to store one or more policies according to some embodiments. In some of the embodiments described herein, the method may take into account the one or more policies stored in the memory 14 of the entity 10.

As illustrated in FIG. 1, in some embodiments, the system can comprise the network 20. As mentioned earlier, in some embodiments, the network 20 can be a (e.g. mobile) core network. However, other types of network are also possible. As illustrated in FIG. 1, in some embodiments, the network 20 can comprise the network gateway 24. However, it will be appreciated that the network gateway 24 may be external to the network 20 (e.g. part of another network, not illustrated in FIG. 1) according to other embodiments. As also illustrated in FIG. 1, the network 20 can comprise one or more UEs 22 (and/or one or more groups of UEs). The one or more policies mentioned earlier can be associated with the one or more UEs 22 (and/or the one or more groups of UEs). As illustrated in FIG. 1, in some embodiments, the system can comprise one or more policy clients 30 and/or one or more domain name service (DNS) servers 40. In some embodiments, any of the one or more DNS servers 40 can comprise a memory (e.g. a database) 44. The memory 44 of a DNS server 40 can be configured to store one or more DNS views (or, more specifically, DNS view configurations) according to some embodiments.

The entity 10 can communicate with the network 20, the one or more policy clients 30, and/or the one or more DNS servers 40, e.g. via at least one application programming interface (API). For example, as illustrated in FIG. 1, the entity 10 may communicate with the network 20 via a first API (which may also be referred to as the "UE mobility or location exposure API"), the entity 10 may communicate with the one or more policy clients 30 via a second API (which may also be referred to as the "policy database configuration API"), and/or the entity 10 may communicate with the one or more DNS servers 40 via a third API (which may also be referred to as the "DNS server configuration API"). In some embodiments, the first API may be offered to the entity 10 by the network 20, the second API may be offered to the one or more policy clients 30 by the entity 10, and/or the third API may be offered to the entity 10 by the one or more DNS servers 40.

The one or more policy clients 30 can, for example, comprise one or more providers of one or more applications and/or one or more services. Thus, in some embodiments, the one or more policy clients 30 may comprise one or more entities that are configured to provide one or more applications and/or one or more services. In some of these embodiments, the one or more applications that the application server 32 can be operable (e.g. configured) to run may be provided by the one or more policy clients 30. Thus, as illustrated in FIG. 1, in some embodiments, the application server 32 and the one or more policy clients 30 can communicate with each other, e.g. via a fourth API. The one or more policy clients 30 can (e.g. through the second API) configure preferences on the manner in which to steer traffic to and/or from one or more UEs (e.g. an individual UE 22 and/or one or more groups of UEs) in the network 20, such as between different sites of the network 20. Thus, in some embodiments, the one or more policies may be generated based on the input provided through the second API.

The one or more DNS servers 40 can be configured to resolve DNS queries generated by UEs 22. In some embodiments, the entity 10 may communicate with the one or more DNS servers 40 to program the one or more DNS servers 40. For example, the one or more DNS servers 40 may be programmed to ensure that the one or more policies (e.g. defined by the one or more policy clients 30) are met.

In some embodiments, the entity 10 may communicate with the network 20 (or the network gateway 24) to observe events indicative of an individual UE 22 (or a group of UEs) connecting to or disconnecting from the network gateway 24. Thus, it can be detected when an association of an individual UE 22 (or a group of UEs) to the network gateway 24 is created, updated, or removed. In some embodiments, the entity 10 may communicate with the network 20 (or the network gateway 24) to obtain one or more criteria that are to be the subject of the one or more policies referred to herein, which may be stored in the memory 14 of the entity 10 according to some embodiments. The one or more criteria may be applicable to an individual UE 22 or to a group of UEs. For example, the one or more criteria may comprise one or more network operator preferences for a UE 22 or a group of UEs (e.g. different levels of UE may have different criteria, such as gold versus bronze UEs).

Figures 2, 3:
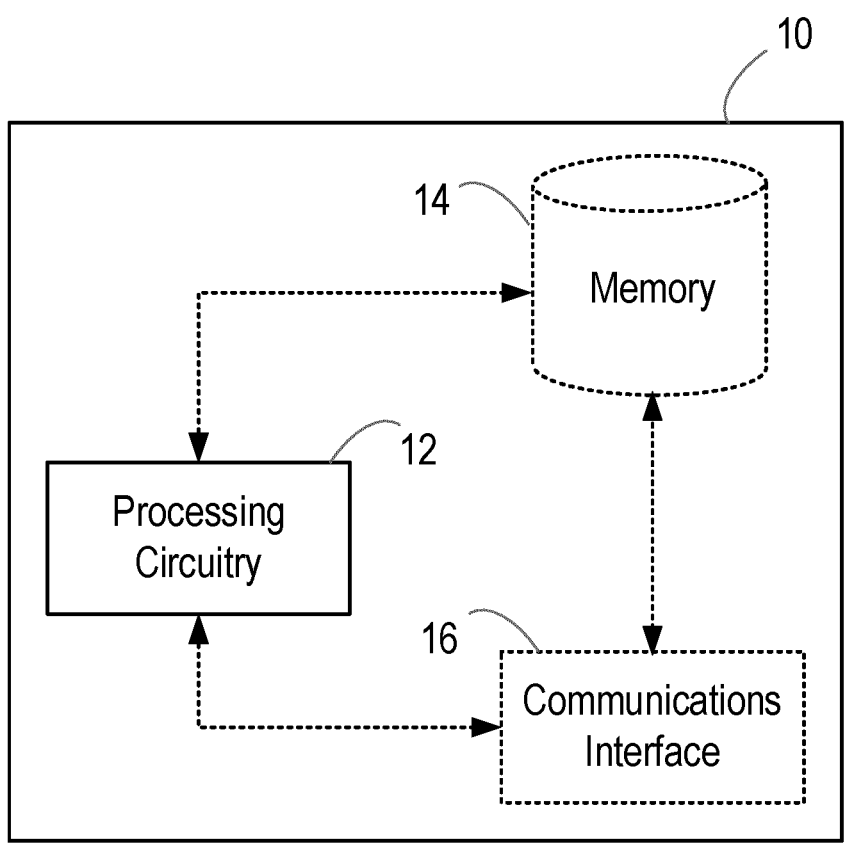
FIG. 2 is a block diagram illustrating an entity according to an embodiment.
FIG. 3 is a flowchart illustrating a method performed by an entity according to an embodiment.

FIG. 2 illustrates the entity 10 in accordance with an embodiment. The entity 10 is for managing traffic between a network gateway 24 and an application server 32. The entity 10 may, for example, be a physical machine (e.g. a server) or a virtual machine (VM). In some embodiments, the entity 10 can be an entity of the network 20. For example, the entity 10 may be a network element, such as a network node, according to some embodiments. In other embodiments, the entity 10 may be an entity that is separate to the network 20.

As illustrated in FIG. 2, the entity 10 comprises processing circuitry (or logic) 12. The processing circuitry 12 controls the operation of the entity 10 and can implement the method described herein in respect of the entity 10. The processing circuitry 12 can be configured or programmed to control the entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the entity 10. In some embodiments, the processing circuitry 12 can be configured to run software to perform the method described herein. The software may be containerised according to some embodiments. Thus, in some embodiments, the processing circuitry 12 may be configured to run a container to perform the method described herein.

Briefly, the processing circuitry 12 of the entity 10 is configured to, in response to a UE 22 connecting to or disconnecting from the network gateway 24, update a network prefix assigned to a DNS view. The network prefix comprises one or more internet protocol (IP) addresses that each identify a UE that is connected to the network gateway 24 and to which the DNS view is accessible. Traffic between the network gateway 24 and the application server 32 is steered according to the DNS view to which the updated network prefix is assigned.

Herein, a DNS view will be understood to mean a set of parameters that specify a manner in which to handle (e.g. resolve and/or forward) a DNS query. In some embodiments, for example, a response to a DNS query may depend on one or more attributes of the DNS query itself, such as the IP address of a UE 22 from which the DNS query originated. A DNS query can be a request for information sent from the UE 22 towards a DNS server 40. The request can, for example, require the translation a domain name of an application server 32 into an IP address for the application server 32. DNS views can thus be applied to implement the steering of traffic (originating from the one or more UEs connected to the network gateway 24) between the network gateway 24 and an application server 32. For example, in some embodiments, a DNS view may specify that requests (e.g. DNS queries) originating from a UE 22 linked to a first location (e.g. a European UE) must be resolved by an application server 32 residing at that first location (e.g. an application server residing in Europe), while other DNS queries can be resolved by an application server 32 at a second location (e.g. a server residing in the US). In some embodiments, the application server 32 may run one or more applications, e.g. provided by one or more policy clients 30. In some of these embodiments, the traffic that is steered between the network gateway 24 and the application server 32 can be a request from a UE 22 to access one or more applications and/or traffic generated by the UE 22 interacting with one or more applications.

This geo-location functionality can be configured by assigning a network prefix comprising the IP address of the UE 22 from which a DNS query originates to a relevant DNS view. By steering traffic between the network gateway 24 and an application server 32 according to a DNS view to which such an updated network prefix is assigned, the traffic steering can take into account changes in the distribution of the one or more UEs to enable more reliable and effective traffic steering without actually requiring tight integration with any core user plane nodes.

As illustrated in FIG. 2 and as mentioned earlier, in some embodiments, the entity 10 may optionally comprise a memory 14. The memory 14 of the entity 10 can comprise a volatile memory or a non-volatile memory. In some embodiments, the memory 14 of the entity 10 may comprise a non-transitory media. Examples of the memory 14 of the entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the entity 10 can be connected to the memory 14 of the entity 10. In some embodiments, the memory 14 of the entity 10 may be for storing program code or instructions which, when executed by the processing circuitry 12 of the entity 10, cause the entity 10 to operate in the manner described herein in respect of the entity 10. For example, in some embodiments, the memory 14 of the entity 10 may be configured to store program code or instructions that can be executed by the processing circuitry 12 of the entity 10 to cause the entity 10 to operate in accordance with the method described herein in respect of the entity 10. Alternatively or in addition, the memory 14 of the entity 10 can be configured to store any information, data, messages, requests, responses, indications, notifications, signals, or similar, that are described herein. The processing circuitry 12 of the entity 10 may be configured to control the memory 14 of the entity 10 to store information, data, messages, requests, responses, indications, notifications, signals, or similar, that are described herein.

In some embodiments, as illustrated in FIG. 2, the entity 10 may optionally comprise a communications interface 16. The communications interface 16 of the entity 10 can be connected to the processing circuitry 12 of the entity 10 and/or the memory 14 of entity 10. The communications interface 16 of the entity 10 may be operable to allow the processing circuitry 12 of the entity 10 to communicate with the memory 14 of the entity and/or vice versa. Similarly, the communications interface 16 of the entity 10 may be operable to allow the processing circuitry 12 of the entity 10 to communicate with the network referred to herein, the network gateway 24 referred to herein, any entities referred to herein, and/or any nodes referred to herein. The communications interface 16 of the entity 10 can be configured to transmit and/or receive information, data, messages, requests, responses, indications, notifications, signals, or similar, that are described herein. In some embodiments, the processing circuitry 12 of the entity 10 may be configured to control the communications interface 16 of the entity 10 to transmit and/or receive information, data, messages, requests, responses, indications, notifications, signals, or similar, that are described herein.

Although the entity 10 is illustrated in FIG. 2 as comprising a single memory 14, it will be appreciated that the entity 10 may comprise at least one memory (i.e. a single memory or a plurality of memories) 14 that operate in the manner described herein. Similarly, although the entity 10 is illustrated in FIG. 2 as comprising a single communications interface 16, it will be appreciated that the entity 10 may comprise at least one communications interface (i.e. a single communications interface or a plurality of communications interface) 16 that operate in the manner described herein. It will also be appreciated that FIG. 2 only shows the components required to illustrate an embodiment of the entity 10 and, in practical implementations, the entity 10 may comprise additional or alternative components to those shown.

FIG. 3 is a flowchart illustrating a method performed by an entity 10 in accordance with an embodiment. The method is for managing traffic between a network gateway 24 and an application server 32. The entity 10 described earlier with reference to FIG. 2 can be configured to operate in accordance with the method of FIG. 3. The method can be performed by or under the control of the processing circuitry 12 of the entity 10 according to some embodiments.

With reference to FIG. 3, as illustrated at block 102, in response to a UE 22 connecting to or disconnecting from the network gateway 24, a network prefix assigned to a DNS view is updated. More specifically, the processing circuitry 12 of the entity 10 can update the network prefix assigned to the DNS view according to some embodiments. The network prefix comprises one or more IP addresses that each identify a UE that is connected to the network gateway 24 and to which the DNS view is accessible. Thus, by updating the network prefix in the manner described, an up-to-date association of one or more IP addresses to the DNS view can be generated. The one or more IP address referred to herein can comprise one or more IP version 4 (IPv4) addresses and/or IP version (IPv6) addresses according to some embodiments. Traffic between the network gateway 24 and the application server 32 is steered according to the DNS view to which the updated network prefix is assigned. In some embodiments, a notification transmitted towards the entity 10 from the network 20 may comprise the network prefix. For example, the network prefix may be encoded in such a notification. In some embodiments, the notification may be an exposure notification.

In some embodiments, updating the network prefix assigned to the DNS view may comprise deleting (or removing) a first network prefix that is currently assigned to the DNS view and/or assigning a second network prefix to the DNS view. In these embodiments, the second network prefix can be a different prefix to the first network prefix. In some embodiments, deleting the first network prefix that is currently assigned to the DNS view may be performed in response to the UE 22 disconnecting from the network gateway 24 and/or assigning the second network prefix to the DNS view may be performed in response to the UE 22 connecting to the network gateway 24.

In some embodiments, the method may comprise deleting the first network prefix that is currently assigned to the DNS view at one or more DNS servers 40 that comprise (e.g. a memory 44 that stores) the DNS view and/or assigning the second network prefix to the DNS view at the one or more DNS servers 40 that comprise (e.g. a memory 44 that stores) the DNS view. In some of these embodiments, the method may also comprise identifying the one or more DNS servers 40 that comprise (e.g. a memory 44 that stores) the DNS view to which the first network prefix is assigned. More specifically, the processing circuitry 12 of the entity 10 can be configured to identify the one or more DNS servers 40 according to some embodiments. In some embodiments involving the second network prefix, the method may comprise calculating the second network prefix. More specifically, the processing circuitry 12 of the entity 10 can be configured to calculate the second network prefix according to some embodiments.

A more detailed example will now be described for the deletion of the first network prefix that is currently assigned to the DNS view. In this example, in response to the UE 22 disconnecting from the network gateway 24, the entity 10 (or, more specifically, the processing circuitry 12 of the entity 10) may look up the DNS view to which the first network prefix is associated. The entity 10 (or, more specifically, the processing circuitry 12 of the entity 10) may identify one or more DNS servers at which the DNS view is to be updated. The entity 10 (or, more specifically, the processing circuitry 12 of the entity 10) may configure the one or more identified DNS servers by deleting the first network prefix.

A more detailed example will now be described for the assignment of the second network prefix to the DNS view. In this example, in response to the UE 22 connecting to the network gateway 24, the entity 10 (or, more specifically, the processing circuitry 12 of the entity 10) may determine one or more policies that are associated with the UE. The one or more policies may be referred to as the best matching policies. The entity 10 (or, more specifically, the processing circuitry 12 of the entity 10) may identify one or more DNS views that are implementing the one or more policies into a set. If more than one DNS views are identified, an error may be raised. If there are no DNS views are identified, a default DNS view may be selected.

The entity 10 (or, more specifically, the processing circuitry 12 of the entity 10) may check if the network prefix is already bound to a DNS view that is different from the identified/selected DNS view. Any suitable network prefix comparator may be applied to perform this check. For example, in some embodiments, an exact match operator may be used, whereby the network prefix is determined to already be assigned to a DNS view that is different from the identified/selected DNS view if the network prefix is exactly the same as a network prefix that is already assigned to the DNS view. In other embodiments, a more specific network prefix operator may be used, whereby the network prefix is determined to already be bound to a DNS view that is different from the identified/selected DNS view if the network prefix is a subset of a network prefix that is already assigned to the DNS view. The DNS view to which the network prefix may already be assigned can be referred to as the "old DNS view", whereas the identified/selected DNS view can be referred to as the "new DNS view".

In some embodiments, if the entity 10 (or, more specifically, the processing circuitry 12 of the entity 10) determines that the network prefix is already assigned to the old DNS view, it may update the old DNS view by removing the network prefix from the association with the old DNS view. When the more specific prefix network operator is used, this step of removing the network prefix can practically be a substitution of a broader network prefix with a narrower network prefix. This allows the new network prefix to be excluded from the association with the old DNS view. The entity 10 (or, more specifically, the processing circuitry 12 of the entity 10) may identify one or more DNS servers at which the DNS view is to be updated. In some embodiments, if an old DNS view is found that needs to be updated, the entity 10 (or, more specifically, the processing circuitry 12 of the entity 10) may configure the one or more identified DNS servers by deleting the network prefix assigned to the old DNS view. The entity 10 (or, more specifically, the processing circuitry 12 of the entity 10) may configure the one or more identified DNS servers by assigning the network prefix to the new DNS view.

In some embodiments, the network prefix may be updated based on one or more policies associated with the UE 22 that is connecting to or disconnecting from a network gateway 24 and/or one or more characteristics of the UE 22 that is connecting to or disconnecting from a network gateway 24. In some of these embodiments, the one or more policies may be associated with the UE 22 only or a group of UEs that comprises the UE. In some embodiments, the one or more policies may be stored in at least one memory, such as at least one memory 14 of the entity 10 and/or at least one other memory external to the entity 10.

In some embodiments, the method may comprise acquiring the one or more policies, e.g. from the at least one memory 14. More specifically, the processing circuitry 12 of the entity 10 can be configured to acquire the one or more policies according to some embodiments. In some embodiments, acquiring the one or more policies may comprise reading the one or more policies from the at least one memory 14. In other embodiments, acquiring the one or more policies may comprise receiving the one or more policies from the at least one memory 14 in response to a request for the one or more policies. For example, the entity 10 may send such a request towards the at least one memory 14 according to some embodiments. In some embodiments, one or more policies may be acquired by reading them from the at least one memory 14, while one or more other policies may be acquired from the at least one memory 14 by receiving them from the at least one memory 14.

In some embodiments, the one or more policies may be stored in the at least one memory 14 subsequent to a deletion (or removal) of at least one policy from the memory 14 and/or an addition (or registration) of at least one policy to the memory 14. In some embodiments, one or more policy clients 30 may request such a deletion and/or removal of at least one policy. The entity 10 (or, more specifically, the processing circuitry 12 of the entity 10) can thus be configured to delete at least one policy from the memory 14 and/or add at least one policy to the memory 14 according to some embodiments.

An example will now be described for the deletion of at least one policy from the memory 14. In response to a request to delete at least one policy from the memory 14, the entity (or, more specifically, the processing circuitry 12 of the entity 10) may read a UE (or subscription) identifier associated with the at least one policy for which deletion is requested. A UE identifier is an identifier associated with at least one policy that identifies a UE 22 to which the at least one policy applies. The identifier associated with the at least one policy for which deletion is requested will be referred to as the "candidate identifier". The entity 10 (or, more specifically, the processing circuitry 12 of the entity 10) may iterate over the stored policies, other than the at least one policy for which deletion is requested, and read the UE identifiers associated with them. If the candidate identifier is associated with any of the read policies, the entity 10 (or, more specifically, the processing circuitry 12 of the entity 10) may continue with reviewing the DNS view based on the remaining policies. When all policies in respect of which the candidate identifier is associated have been found, the entity 10 (or, more specifically, the processing circuitry 12 of the entity 10) may delete the at least one policy for which deletion is requested. The entity 10 (or, more specifically, the processing circuitry 12 of the entity 10) may continue reviewing the DNS view configuration based on the remaining policies.

An example will now be described for the addition of at least one policy to the memory 14. In response to a request to add at least one policy to the memory 14, the entity 10 (or, more specifically, the processing circuitry 12 of the entity 10) may read characteristic information of the UE 22 or a group of UEs comprising the UE. An example of characteristic information of the UE 22 is a generic public subscriber identifier (GPSI) of the UE, and an example of characteristic information of the group of UEs is an external group identifier of the group of UEs. The entity 10 (or, more specifically, the processing circuitry 12 of the entity 10) may formulate a candidate subscription by filling in the data fields of the subscription based on a received input.

The entity 10 (or, more specifically, the processing circuitry 12 of the entity 10) may iterate over the active subscriptions and check if there are any active subscriptions that refer to exactly the same UE 22 or UE group as the candidate subscription. If there is such an active subscription, the entity 10 (or, more specifically, the processing circuitry 12 of the entity 10) may associate the identifier of this active subscription with the policy and continue with reviewing the DNS view based on the new policy set. On the other hand, if there is no active subscription, the entity 10 (or, more specifically, the processing circuitry 12 of the entity 10) may post the candidate subscription to the network 20 for the network 20 to make the subscription active. When the subscription has successfully activated, the entity 10 (or, more specifically, the processing circuitry 12 of the entity 10) may associate the identifier of the newly activated subscription with the policy and continue with reviewing the DNS view based on the new policy set. As a continuation of any of the above procedures, the entity 10 (or, more specifically, the processing circuitry 12 of the entity 10) may review the DNS view based on the updated policy set.

In some embodiments, the method may comprise identifying the one or more policies that are associated with the UE 22 that is connecting to or disconnecting from a network gateway 24, e.g. by identifying the one or more policies that comprise an identifier that identifies the UE 22 that is connecting to or disconnecting from the network gateway 24. In some embodiments, the one or more policies may each be identified with a Boolean expression comprising a name of a set of UEs to which the one or more policies apply, an identifier of the network gateway 24, and/or UE group characteristics data. An example of an identifier of the network gateway 24 is a data network attachment identifier (DNAI). A set of UEs may be encoded with an external group identifier (EGI), whereas an individual UE 22 may be encoded with the IP address of that UE 22 or the GPSI.

Although not illustrated in FIG. 3, in some embodiments, the method may comprise monitoring the UE 22 and/or the network gateway 24 to identify the UE 22 connecting to or disconnecting from the network gateway 24. More specifically, the processing circuitry 12 of the entity 10 can be configured to monitor the UE 22 and/or the network gateway 24 for this purpose according to some embodiments.

In embodiments where the UE 22 is monitored, it may be that individual UE session events and/or mobility management events are monitored according to some embodiments. Thus, the network prefix assigned to the DNS view may be updated on a per UE session event basis according to some of these embodiments. In some of these embodiments, the one or more policies (which may include UE group specifications) may refer to only one UE. In an example implementation, the UE 22 can be characterised via a GPSI, while a DNAI may denote the network gateway 24. The entity 10 can utilise, for example, the network exposure function (NEF) traffic influence API that is defined in 3GPP TS 29.522 V16.5.0 or the session management event exposure service API (which can be referred to as "Nsmf_EventExposure") that is defined in 3GPP TS 29.508 V17.0.0.

In embodiments where the network gateway 24 is monitored, it may be that the network gateway 24 (or a configuration of the network gateway 24) is monitored to determine the IP addresses to be allocated for a group of UEs at a certain network gateway. In some of these embodiments, the one or more policies (which may include UE group specifications) may refer to a group of (e.g. all) UEs assigned to the network 20. In some embodiments, the network name may be used to characterise the UE group. The network gateway 24 can be described with a DNAI in this case as well.

In some embodiments, both the UE 22 and the network gateway 24 may be monitored in the manner described earlier. In these embodiments, a DNS view configuration derived from one or more UE session mobility events may pre-empt a configuration instructions from the other source.

In some embodiments, the methods described herein may be performed in response to receiving a notification that the UE 22 has connected to or disconnected from the network gateway 24. For example, the entity 10 (or, more specifically, the processing circuitry 12 of the entity 10) may receive the notification, e.g. via the communications interface 16 of the entity 10. In some embodiments, the entity 10 may be subscribed to receive this notification. In some embodiments, the first API (which may be offered to the entity 10 by the network 20) may allow the entity 10 to subscribe to receiving the notification. In some embodiments, the notification may be indicative of changes in one or more sessions of an individual UE 22 or a group of UEs. In some embodiments, the subscription to the notification may be reviewed by the entity 10 (or, more specifically, the processing circuitry 12 of the entity 10) when at least one policy is updated in (e.g. deleted from and/or added to) the memory 14 in the manner described earlier. Once the entity 10 has subscribed to the notification, the entity 10 receives such notifications.

In some embodiments, the notification may comprise the second network prefix referred to herein. That is, in some embodiments, the notification may comprise the network prefix that is newly assigned to the DNS view. Alternatively or in addition, in some embodiments, the notification may comprise an identifier that identifies the UE 22 that is connecting to or disconnecting from a network gateway 24 and/or an identifier that identifies the network gateway 24. In some embodiments, the identifier that identifies the UE 22 may comprise the IP address of the UE 22 and/or a GPSI of the UE. In some embodiments, the entity 10 may make use of an NEF traffic influence API offered by the network 20. In some of these embodiments, an individual UE 22 may be identified via an associated GPSI. Alternatively or in addition to the identifier that identifies the UE, in some embodiments, the identifier that identifies the network gateway 24 comprises a DNAI. In some embodiments, the notification may comprise two sets of such identifiers that identify the network gateway 24. For example, a first set of such identifiers may identify at least one network gateway 24 that is disconnected from the UE, while a second set of such identifiers may identify at least one network gateway 24 that is connected to the UE. In some of these embodiments, both sets may comprise of zero or more identifiers.

Figure 4:
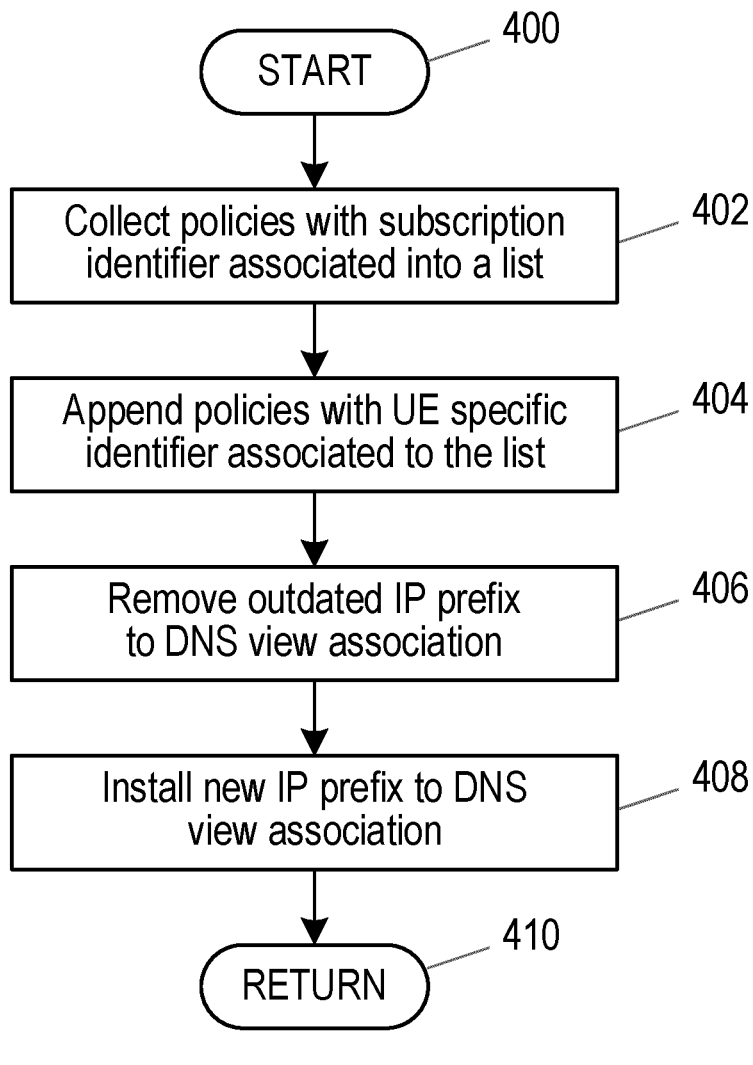
FIG. 4 is a flowchart illustrating a method performed by an entity according to an embodiment.

FIG. 4 is a flowchart illustrating a method performed by an entity 10 in accordance with an embodiment. The method is for managing traffic between a network gateway 24 and an application server 32. The entity 10 described earlier with reference to FIG. 2 can be configured to operate in accordance with the method of FIG. 4. The method can be performed by or under the control of the processing circuitry 12 of the entity 10 according to some embodiments. The method starts at block 400 of FIG. 4. The method can be performed in response to a UE 22 connecting to or disconnecting from a network gateway 24.

As illustrated at block 402 of FIG. 4, in some embodiments, the method may comprise acquiring (e.g. collecting) one or more policies, e.g. in the manner described earlier. More specifically, the processing circuitry 12 of the entity 10 can be configured to acquire the one or more policies according to some embodiments. As mentioned earlier, in some embodiments, the method may comprise identifying the one or more policies that are associated with the UE 22 that is connecting to or disconnecting from a network gateway 24 by identifying the one or more policies that comprise an identifier that identifies the UE 22 that is connecting to or disconnecting from a network gateway 24. In some embodiments, the entity 10 (or, more specifically, the processing circuitry 12 of the entity 10) may be configured to collate the one or more identified policies into a list to which the identifier of the UE 22 is associated. The one or more identified policies may refer to the individual UE 22 or to a group of UEs comprising the UE.

As illustrated at block 404 of FIG. 4, in some embodiments, the method may comprise appending the one or more identified policies to such a list that refers to the identifier of the UE. In some embodiments, the identifier of the UE 22 may be indicated in a notification (e.g. an exposure notification) received from the network 20. In some embodiments, the identifier of the UE 22 may be the IP address of the UE 22 and/or the generic public subscriber identifier (GPSI) of the UE.

As illustrated at blocks 406 and 408 of FIG. 4, a network prefix assigned to a DNS view is updated in the manner described earlier. The network prefix comprises one or more IP addresses that each identify a UE that is connected to the network gateway 24 and to which the DNS view is accessible. Traffic between the network gateway 24 and the application server 32 is steered according to the DNS view to which the updated network prefix is assigned. In more detail, in some embodiments, updating the network prefix assigned to the DNS view may comprise deleting a first network prefix that is currently assigned to the DNS view (as illustrated at block 406 of FIG. 4) and assigning a second network prefix to the DNS view (as illustrated at block 408 of FIG. 4). The second network prefix can be a different prefix to the first network prefix. In some embodiments, assigning the second network prefix may comprise calculating the second network prefix and/or installing the second network prefix.

Thus, in this way, the outdated network prefix currently assigned to the DNS view can be deleted from the DNS infrastructure and a new network prefix can be added into the DNS infrastructure. As described earlier, in some embodiments, the deletion may occur in response to (e.g. a notification indicative of) the UE 22 disconnecting from the network gateway 24 and/or the addition may occur in response to (e.g. a notification indicative of) the UE 22 connecting to the network gateway 24. The method ends at block 410 of FIG. 4.

Although the methods provided herein have been described in respect of a single network gateway 24, it will be understood that the methods may be performed in respect of at least one network gateway 24, i.e. a single network gateway or a plurality of network gateways. For example, in response to a UE 22 connecting to or disconnecting from at least one network gateway 24, the updating of the network prefix assigned to the DNS view accessible to the UE 22 as described herein may be performed for each network gateway 24.

There is also provided a computer program comprising instructions which, when executed by processing circuitry (such as the processing circuitry 12 of the entity 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the entity 10 described earlier) to cause the processing circuitry to perform at least part of the method described herein. There is provided a computer program product comprising a carrier containing instructions for causing processing circuitry (such as the processing circuitry 12 of the entity 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the entity 10 functionality described herein can be performed by hardware. Thus, in some embodiments, the entity 10 described herein can be a hardware entity. However, it will also be understood that optionally at least part or all of the entity 10 functionality described herein can be virtualized. For example, the functions performed by the entity 10 described herein can be implemented in software running on generic hardware that is configured to orchestrate the entity functionality. Thus, in some embodiments, the entity 10 described herein can be a virtual entity. In some embodiments, at least part or all of the entity 10 functionality described herein may be performed in a network enabled cloud. Thus, the method described herein can be realised as a cloud implementation according to some embodiments. The entity 10 functionality described herein may all be at the same location or at least some of the entity functionality may be distributed, e.g. the entity 10 functionality described herein may be performed by one or more different entities.

It will be understood that at least some or all of the method steps described herein can be automated in some embodiments. That is, in some embodiments, at least some or all of the method steps described herein can be performed automatically. The method described herein can be a computer-implemented method.

Therefore, in the manner described herein, there is advantageously provided a technique for managing traffic between a network gateway 24 and an application server 32. In accordance with the technique described herein, it is possible to manage the association of network prefixes and DNS views taking into account the mobility of UEs in the network by way of the connection to and disconnection from network gateways.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a computing device for managing traffic between a network gateway and an application server, the method comprising:

collecting one or more policies;

receiving a notification that a user equipment (UE) has connected to or disconnected from the network gateway, the notification comprising an identifier of the UE;

updating a network prefix that is currently assigned to a domain name service (DNS) view in response to receiving the notification and based on the one or more policies that are applicable to the UE, the updating comprising:

calculating a second network prefix;

assigning the calculated second network prefix to the DNS view at one or more DNS servers that comprise the DNS view, the second network prefix being different from the first network prefix; and unassigning the first network prefix from the DNS view at the one or more DNS servers that comprise the DNS view;

the first network prefix that is currently assigned to the DNS view comprising two or more internet protocol (IP) addresses that each identify a UE that is connected to the network gateway; and traffic between the network gateway and the application server being steered according to the DNS view when the traffic originates from a UE having an IP address that falls within the network prefix currently assigned to the DNS view.

2. The method of claim 1, wherein updating the first network prefix assigned to the DNS view comprises:

deleting the first network prefix that is currently assigned to the DNS view.

3. The method of claim 2, wherein:

deleting the first network prefix that is currently assigned to the DNS view is performed in response to the UE disconnecting from the network gateway; and/or assigning the second network prefix to the DNS view is performed in response to the UE connecting to the network gateway.

4. The method of claim 2, wherein:

deleting the first network prefix that is currently assigned to the DNS view comprises deleting the first network prefix at one or more DNS servers that comprise the DNS view; and/or assigning the second network prefix to the DNS view comprises assigning the second network prefix at the one or more DNS servers that comprise the DNS view.

5. The method of claim 4, further comprising identifying the one or more DNS servers that comprise the DNS view to which the first network prefix is assigned.

6. The method of claim 1, wherein the notification comprises an identifier that identifies:

the UE that is connecting to or disconnecting from the network gateway; and/or the network gateway.

7. The method of claim 1, wherein the notification comprises the second network prefix.

8. The method of claim 1, wherein the one or more policies are associated with the UE only or a group of UEs that comprises the UE.

9. A computing device comprising:

processing circuitry and memory, the memory containing instructions executable by the processing circuitry whereby the computing device is configured to:

collect one or more policies;

receive a notification that a user equipment (UE) has connected to or disconnected from a network gateway, the notification comprising an identifier of the UE;

update a first network prefix that is currently assigned to a domain name service (DNS) view in response to receiving the notification and based on the one or more policies that are applicable to the UE, the updating comprising:

calculate a second network prefix;

assign the calculated second network prefix to the DNS view at one or more DNS servers that comprise the DNS view, the second network prefix being different from the first network prefix; and unassign the first network prefix from the DNS view at the one or more DNS servers that comprise the DNS view;

the first network prefix that is currently assigned to the DNS view comprising two or more internet protocol (IP) addresses that each identify a UE that is connected to the network gateway; and traffic between the network gateway and an application server being steered according to the DNS view when the traffic originates from a UE having an IP address that falls within the network prefix currently assigned to the DNS view.

10. The computing device of claim 9, wherein to update the first network prefix assigned to the DNS view, the computing device is configured to:

delete the first network prefix that is currently assigned to the DNS view.

11. The computing device of claim 10, wherein the computing device is configured to:

delete the first network prefix that is currently assigned to the DNS view in response to the UE disconnecting from the network gateway; and/or assign the second network prefix to the DNS view in response to the UE connecting to the network gateway.

12. The computing device of claim 10, wherein the computing device is configured to:

delete the first network prefix that is currently assigned to the DNS view at one or more DNS servers that comprise the DNS view; and/or assign the second network prefix to the DNS view at the one or more DNS servers that comprise the DNS view.

13. The computing device of claim 12, wherein the computing device is further configured to identify the one or more DNS servers that comprise the DNS view to which the first network prefix is assigned.

14. The computing device of claim 9, wherein the notification comprises an identifier that identifies:

the UE that is connecting to or disconnecting from the network gateway; and/or the network gateway.

15. The computing device of claim 9, wherein the notification comprises the second network prefix.

16. A non-transitory computer readable medium storing a computer program product comprising instructions which, when executed on processing circuitry of a computing device, cause the processing circuitry to:

collect one or more policies;

receive a notification that a user equipment (UE) has connected to or disconnected from a network gateway, the notification comprising an identifier of the UE;

update a first network prefix that is currently assigned to a domain name service (DNS) view in response to receiving the notification and based on the one or more policies that are applicable to the UE, the updating comprising:

calculate a second network prefix;

assign the calculated second network prefix to the DNS view at one or more DNS servers that comprise the DNS view, the second network prefix being different from the first network prefix; and unassign the first network prefix from the DNS view at the one or more DNS servers that comprise the DNS view;

the first network prefix that is currently assigned to the DNS view comprising two or more internet protocol (IP) addresses that each identify a UE that is connected to the network gateway; and traffic between the network gateway and an application server being steered according to the DNS view when the traffic originates from a UE having an IP address that falls within the network prefix currently assigned to the DNS view.

\* \* \* \* \*